United States Patent
Mori

(10) Patent No.: US 11,572,460 B2
(45) Date of Patent: Feb. 7, 2023

(54) THERMOPLASTIC ELASTOMER FOR CARBON FIBER REINFORCED PLASTIC BONDING LAMINATION

(71) Applicant: MCPP Innovation LLC, Chiyoda-ku (JP)

(72) Inventor: Hiroyuki Mori, Tokyo (JP)

(73) Assignee: MCPP Innovation LLC, Chiyoda-ku (JP)

( * ) Notice: Subject to any disclaimer, the term of this patent is extended or adjusted under 35 U.S.C. 154(b) by 0 days.

(21) Appl. No.: 16/572,077

(22) Filed: Sep. 16, 2019

(65) Prior Publication Data

US 2020/0010649 A1    Jan. 9, 2020

Related U.S. Application Data

(63) Continuation of application No. PCT/JP2018/010320, filed on Mar. 15, 2018.

(30) Foreign Application Priority Data

Mar. 17, 2017  (JP) .............................. JP2017-052359

(51) Int. Cl.
    *C08L 9/06* (2006.01)
    *C08L 53/02* (2006.01)
    *C08L 91/00* (2006.01)
    *C08F 22/06* (2006.01)
    *C08F 10/06* (2006.01)
    *C08F 12/08* (2006.01)

(52) U.S. Cl.
    CPC ................ *C08L 9/06* (2013.01); *C08F 10/06* (2013.01); *C08F 12/08* (2013.01); *C08F 22/06* (2013.01); *C08L 53/025* (2013.01); *C08L 91/00* (2013.01); *C08L 2207/04* (2013.01)

(58) Field of Classification Search
    CPC .......... C08L 9/06; C08L 53/025; C08L 91/00; C08L 2207/04; C08F 10/06; C08F 12/08; C08F 22/06
    See application file for complete search history.

(56) References Cited

U.S. PATENT DOCUMENTS

| 6,106,952 | A | 8/2000 | Yamashita et al. |
| 2001/0018490 | A1* | 8/2001 | Mashita ................ C08L 53/025 525/94 |
| 2005/0187355 | A1 | 8/2005 | Tasaka et al. |
| 2006/0160951 | A1 | 7/2006 | Mori et al. |
| 2011/0015333 | A1 | 1/2011 | Fujiwara et al. |
| 2012/0034833 | A1 | 2/2012 | Schaube et al. |
| 2012/0095135 | A1 | 4/2012 | Mori et al. |
| 2013/0157069 | A1 | 6/2013 | Minamide et al. |
| 2018/0208302 | A1 | 7/2018 | Schaube et al. |

FOREIGN PATENT DOCUMENTS

| CN | 104893315 | | 9/2015 |
| CN | 104893315 A | * | 9/2015 |
| JP | 7-256725 A | | 10/1995 |
| JP | 11-323073 A | | 11/1999 |
| JP | 2001-19829 A | | 1/2001 |
| JP | 2001-220490 A | | 8/2001 |
| JP | 2001-270991 A | | 10/2001 |
| JP | 2003-128870 A | | 5/2003 |
| JP | 2005-75896 A | | 3/2005 |
| JP | 2005-264139 A | | 9/2005 |
| JP | 2005-272528 A | | 10/2005 |
| JP | 2006-89546 A | | 4/2006 |
| JP | 2006-199952 A | | 8/2006 |
| JP | 2008-291117 A | | 12/2008 |
| JP | 2009-91385 A | | 4/2009 |
| JP | 2012-20458 A | | 2/2012 |
| JP | 2012-523334 A | | 10/2012 |
| JP | 2012-233066 A | | 11/2012 |
| WO | WO 2009/119592 A1 | | 10/2009 |
| WO | WO 2012/026501 A1 | | 3/2012 |

OTHER PUBLICATIONS

International Search Report dated May 29, 2018 in PCT/JP2018/010320 filed Mar. 15, 2018 (with English translation).
Written Opinion dated May 29, 2018 in PCT/JP2018/010320 filed Mar. 15, 2018.
Extended European Search Report dated Feb. 18, 2020 in European Patent Application No. 18768651.4, 6 pages.
Japanese Office Action dated Jun. 22, 2021 in Japanese Patent Application No. 2018-045733 (with unedited computer generated English translation), 8 pages.
Office Action dated Nov. 29, 2021, in corresponding Chinese Patent Application 201880018221.8 (with English-language Translation).

* cited by examiner

*Primary Examiner* — Robert D Harlan
(74) *Attorney, Agent, or Firm* — Oblon, McClelland, Maier & Neustadt, L.L.P.

(57) ABSTRACT

The present invention relates to a thermoplastic elastomer for carbon fiber reinforced plastic bonding lamination, which is contained in a layer to be laminated on a layer composed of a carbon-fiber reinforced plastic, wherein the thermoplastic elastomer for carbon fiber reinforced plastic bonding lamination contains a styrene-based thermoplastic elastomer and a polymer modified by an α,β-unsaturated carboxylic acid, the styrene-based thermoplastic elastomer contains components (a) to (d), and a concentration of an α,β-unsaturated carboxylic acid derived from the polymer modified by the α,β-unsaturated carboxylic acid is 0.01 to 10% by mass.

21 Claims, No Drawings

THERMOPLASTIC ELASTOMER FOR CARBON FIBER REINFORCED PLASTIC BONDING LAMINATION

TECHNICAL FIELD

The present invention relates to a thermoplastic elastomer which is used for bonding lamination between carbon fiber reinforced plastics or as a skin in a carbon fiber reinforced plastic laminate and to a laminated molded article using the thermoplastic elastomer.

In addition, the present invention relates to an automobile parts structure, a shipping parts structure, and a power parts structure, each of which is composed of the aforementioned laminated molded article, and to a bonding method of carbon fiber reinforced plastics.

BACKGROUND ART

Composite materials using a carbon fiber as a reinforced fiber are called as carbon fiber reinforced plastics (CFRP) and used for industrial materials inclusive of aviation members as well as sports leisure goods, such as golf shafts and tennis rackets, shipping members, and so on. In recent years, such composite materials have also begun to be put into practical use for automobile parts taking advantage of their characteristics of lightweight and strength.

The carbon fiber reinforced plastics are excellent in lightweight and are watched as a substitute for metal; however, in the case where an impact due to strong energy is applied, or in the case where a vibration is generated due to the impact, there is involved such a drawback that the carbon fiber reinforced plastics cannot absorb the energy, so that they are broken to pieces. For that reason, the carbon fiber reinforced plastics are difficult to be applied directly for structural members and so on.

As an improvement thereof, Patent Literature 1 proposes to laminate a thermoplastic elastomer layer on a carbon fiber reinforced plastic and describes that the thermoplastic elastomer layer contains at least one crosslinking agent selected from the group of peroxides, amines, and/or bisphenols and is constituted of ethylene propylene rubber (EPM), ethylene propylene diene rubber (EPDM), ethylene acrylate rubber (EAM), fluorocarbon rubber (FCM), acrylate rubber (ACM), acrylonitrile butadiene rubber (NBR), optionally mixed with polyvinyl chloride (PVC), hydrogenated nitrile rubber (HNBR), carboxylate nitrile rubber (XNBR), hydrogenated carboxylate-nitrile rubber (XHNBR), natural rubber (NR), ethylene vinyl acetate (EVA), chlorosulfonyl polyethylene rubber (CSM), chlorinated polyethylene (CM), butyl rubber (BIIR) or halobutyl rubber, silicone rubber (VMQ, MVQ), fluorosilicone rubber (FVMQ, MFQ), chlorohydrin rubber (CO), epichlorohydrin rubber (ECO), polychloroprene rubber (CR), one-component polyurethane (PU) or a combination or a blend of the aforementioned substances.

BACKGROUND ART LITERATURE

Patent Literature

Patent Literature 1: JP-A-2012-523334

SUMMARY OF INVENTION

Technical Problem

However, the carbon fiber reinforced plastic/thermoplastic elastomer laminate exemplified in Patent Literature 1 involves the following problems.

Namely, for example, an unreacted epoxy resin is generally impregnated in a carbon fiber reinforced plastic in a prepreg, and when heated and pressurized in a reaction temperature region of the epoxy resin at the time of molding, the epoxy resin is solidified and molded as a structure. Meanwhile, when the thermoplastic elastomer is melted at the time of molding, the molten polymers contribute to bonding to each other, thereby exhibiting a bonding effect. For this reason, it is desired that not only the thermoplastic elastomer is basically constituted of components having compatibility or reactivity with the epoxy resin, but also it is melt bonded in a molding temperature region of the epoxy resin if possible.

However, the melting temperature of a general thermoplastic elastomer described in Patent Literature 1 is high in comparison with the molding temperature region of the epoxy resin. Such a thermoplastic elastomer is not melted at the molding temperature of the epoxy resin, and therefore, there was a case where it is not suited for melt bonding. In addition, it was noted that if there is no reactivity with the epoxy resin, almost all of thermoplastic elastomers are not bonded to the epoxy resin, so that they are easily peeled off.

Meanwhile, there is a method in which after molding a molded article of a carbon fiber reinforced plastic is molded, an adhesive is applied to stick a thermoplastic elastomer sheet onto the surface of the carbon fiber reinforced plastic. However, when a structure has a complicated shape, it is difficult to uniformly apply the adhesive. Additionally, there is such a problem that not only the number of steps increases in proportion to the application of the adhesive, but also the time required for production becomes long.

In order to stably maintain the impact resistance of a structure composed of a carbon fiber reinforced plastic, even in a complicated structure of carbon fiber reinforced plastics, it is required that a thermoplastic elastomer sheet can be uniformly stuck with good adhesiveness, and the resulting structure is stable even after a lapse of time and has high adhesiveness without causing peeling.

However, among the materials constituting the thermoplastic elastomer described in Patent Literature 1, there is included one in which as the period of storage is longer, crosslinking of the component of the thermoplastic elastomer used is more likely advanced, and therefore, there was a case where bondability as the thermoplastic elastomer sheet after long-term storage is not revealed.

Furthermore, from the standpoint of enhancement of a degree of freedom of production, it has been desired to develop a thermoplastic elastomer in which even after storing a thermoplastic elastomer sheet, in molding using a typical prepreg, a laminate with a carbon fiber reinforced plastic can be molded with good adhesiveness without necessity of altering the method of construction and also prolonging the molding time.

In view of the aforementioned conventional actual situation, the present invention has been made. The present invention is aimed to provide a thermoplastic elastomer for carbon fiber reinforced plastic bonding lamination, in which lamination molding with a carbon fiber reinforced plastic can be readily performed; adhesiveness to the carbon fiber reinforced plastic is high; impact resistance of the carbon fiber reinforced plastic can be thoroughly improved through integral molding with the carbon fiber reinforced plastic; and even in molding after long-term storage, it is possible to perform lamination molding with the carbon fiber reinforced plastic with good adhesiveness, and also a laminated molded article using this thermoplastic elastomer.

In addition, the present invention is aimed to provide an automobile parts structure, a shipping parts structure, and a power parts structure, each of which is composed of the aforementioned laminated molded article, and also a bonding method of carbon fiber reinforced plastics.

Solution to Problem

In order to solve the aforementioned problem, the present inventor made extensive and intensive investigations. As a result, it has been found that a thermoplastic elastomer containing a styrene-based thermoplastic elastomer and a polymer modified by an α,β-unsaturated carboxylic acid so as to have a predetermined concentration of an α,β-unsaturated carboxylic acid becomes a thermoplastic elastomer which can be readily integrally molded with a carbon fiber reinforced plastic even having a complicated structure, with not only good follow-up properties but also good uniformity and adhesiveness and can enhance impact resistance of the carbon fiber-forced plastic through lamination, and even after storage, its moldability and adhesiveness are not impaired, thereby leading to the present invention.

[1] A thermoplastic elastomer for carbon fiber reinforced plastic bonding lamination, which is contained in a layer to be laminated on a layer composed of a carbon-fiber reinforced plastic,
wherein the thermoplastic elastomer for carbon fiber reinforced plastic bonding lamination contains a styrene-based thermoplastic elastomer and a polymer modified by an α,β-unsaturated carboxylic acid,
the styrene-based thermoplastic elastomer contains the following components (a) to (d), and
a concentration of an α,β-unsaturated carboxylic acid derived from the polymer modified by the α,β-unsaturated carboxylic acid is 0.01 to 10% by mass:
component (a): a hydrogenated block copolymer which is a hydrogenated product of an (A)-(B) block copolymer and/or an (A)-(B)-(A) block copolymer composed of a vinyl aromatic compound polymer block (A) and a conjugated diene polymer block (B), wherein at least 80% of double bonds of the conjugated diene moiety of the conjugated diene polymer block (B) is saturated through hydrogenation, and a weight average molecular weight thereof is 80,000 to 1,000,000;
component (b): a softening agent for hydrocarbon-based rubber;
component (c): a hydrogenated block copolymer composed of an (A)-(C)-(A) triblock copolymer which is composed of a vinyl aromatic compound polymer block (A) and a conjugated diene polymer block (C), wherein the conjugated diene polymer block (C) is constituted of isoprene; and a part or all of carbon-carbon double bonds based on isoprene are hydrogenated; and
component (d): an olefin-based crystalline resin.

[2] The thermoplastic elastomer for carbon fiber reinforced plastic bonding lamination according to [1],
wherein based on 100 parts by mass of the sum total of the component (a) and the component (b), a content of the component (c) is 20 to 300 parts by mass and a content of the component (d) is 10 to 100 parts by mass; and
based on 100% by mass of the sum total of the component (a) and the component (b), an occupying proportion of the component (a) is 20 to 80% by mass and an occupying proportion of the component (b) is 80 to 20% by mass.

[3] The thermoplastic elastomer for carbon fiber reinforced plastic bonding lamination according to [1] or [2], wherein the polymer modified by the α,β-unsaturated carboxylic acid is a polypropylene modified by a maleic anhydride.

[4] The thermoplastic elastomer for carbon fiber reinforced plastic bonding lamination according to any one of [1] to [3], wherein the component (a) is a hydrogenated block copolymer having a content of the vinyl aromatic compound polymer block (A) of 10 to 50% by mass.

[5] The thermoplastic elastomer for carbon fiber reinforced plastic bonding lamination according to any one of [1] to [4], wherein the component (c) is a hydrogenated block copolymer in which the content of the vinyl aromatic compound polymer block (A) is 10 to 50% by mass, a weight average molecular weight is 30,000 to 300,000, and at least 50% of double bonds of the isoprene moiety is saturated through hydrogenation.

[6] The thermoplastic elastomer for carbon fiber reinforced plastic bonding lamination according to any one of [1] to [5], wherein the component (b) is a paraffin-based oil having a weight average molecular weight of 300 to 2,000.

[7] The thermoplastic elastomer for carbon fiber reinforced plastic bonding lamination according to any one of [1] to [6], wherein the component (d) is at least one olefin-based crystalline resin selected from the group consisting of a homopolypropylene, a block polypropylene, and a random polypropylene, each having a melt flow rate (at 230° C. and a load of 21.2 N) of 0.01 to 100 g/10 min.

[8] A laminated molded article containing a layer composed of a carbon fiber reinforced plastic and a thermoplastic elastomer layer composed of a thermoplastic elastomer laminated on the carbon fiber reinforced plastic,
wherein the thermoplastic elastomer contains a styrene-based thermoplastic elastomer and a polymer modified by an α,β-unsaturated carboxylic acid,
the styrene-based thermoplastic elastomer contains at least the following component (c), and
a concentration of an α,β-unsaturated carboxylic acid derived from the polymer modified by the α,β-unsaturated carboxylic acid is 0.01 to 10% by mass:
component (c): a hydrogenated block copolymer composed of an (A)-(C)-(A) triblock copolymer which is composed of a vinyl aromatic compound polymer block (A) and a conjugated diene polymer block (C), wherein the conjugated diene polymer block (C) is constituted of isoprene, and a part or all of carbon-carbon double bonds based on isoprene are hydrogenated.

[9] The laminated molded article according to [8],
wherein the styrene-based thermoplastic elastomer contains the following components (a), (b), and (d),
based on 100 parts by mass of the sum total of the component (a) and the component (b), a content of the component (c) is 20 to 300 parts by mass and a content of the component (d) is 10 to 100 parts by mass, and
based on 100% by mass of the sum total of the component (a) and the component (b), an occupying proportion of the component (a) is 20 to 80% by mass and an occupying proportion of the component (b) is 80 to 20% by mass:
component (a): a hydrogenated block copolymer which is a hydrogenated product of an (A)-(B) block copolymer and/or an (A)-(B)-(A) block copolymer composed of a vinyl aromatic compound polymer block (A) and a conjugated diene polymer block (B), wherein at least 80% of double bonds of the conjugated diene moiety of the conjugated diene polymer block (B) is saturated through hydrogenation, and a weight average molecular weight thereof is 80,000 to 1,000,000;

component (b): a softening agent for hydrocarbon-based rubber; and component (d): an olefin-based crystalline resin.

[10] The laminated molded article according to [8] or [9], wherein the polymer modified by the α,β-unsaturated carboxylic acid is a polypropylene modified by a maleic anhydride.

[11] The laminated molded article according to [9], wherein the component (a) is a hydrogenated block copolymer having a content of the vinyl aromatic compound polymer block (A) of 10 to 50% by mass.

[12] The laminated molded article according to any one of [8] to [11], wherein the component (c) is a hydrogenated block copolymer in which a content of the vinyl aromatic compound polymer block (A) is 10 to 50% by mass, a weight average molecular weight is 30,000 to 300,000, and at least 50% of double bonds of the isoprene moiety is saturated through hydrogenation.

[13] The laminated molded article according to [9], wherein the component (b) is a paraffin-based oil having a weight average molecular weight of 300 to 2,000.

[14] The laminated molded article according to [9], wherein the component (d) is at least one olefin-based crystalline resin selected from the group consisting of a homopolypropylene, a block polypropylene, and a random polypropylene, each having a melt flow rate (at 230° C. and a load of 21.2 N) of 0.01 to 100 g/10 min.

[15] The laminated molded article according to any one of [8] to [14], wherein a sliding material layer is contained on the surface of the thermoplastic elastomer layer on the opposite side to the carbon fiber reinforced plastic.

[16] An automobile parts structure containing the laminated molded article according to any one of [8] to [14].

[17] A shipping parts structure containing the laminated molded article according to any one of [8] to [14].

[18] A power parts structure containing the laminated molded article according to any one of [8] to [14].

[19] A method of bonding a carbon fiber reinforced plastic including using a thermoplastic elastomer, wherein the thermoplastic elastomer contains a styrene-based thermoplastic elastomer and a polymer modified by an α,β-unsaturated carboxylic acid, the styrene-based thermoplastic elastomer contains at least the following component (c), and a concentration of an α,β-unsaturated carboxylic acid derived from the polymer modified by the α,β-unsaturated carboxylic acid is 0.01 to 10% by mass:

component (c): a hydrogenated block copolymer composed of an (A)-(C)-(A) triblock copolymer which is composed of a vinyl aromatic compound polymer block (A) and a conjugated diene polymer block (C), wherein the conjugated diene polymer block (C) is constituted of isoprene, and a part or all of carbon-carbon double bonds based on isoprene are hydrogenated.

Effects of Invention

The thermoplastic elastomer for carbon fiber reinforced plastic bonding lamination of the present invention can be readily subjected to lamination and integral molding with a carbon fiber reinforced plastic even having a complicated structure, with not only good follow-up properties but also good uniformity and adhesiveness and can improve impact resistance of the carbon fiber reinforced plastic.

Moreover, in the thermoplastic elastomer for carbon fiber reinforced plastic bonding lamination of the present invention, even after long-term storage, its moldability, adhesiveness, and improving effect of impact resistance are not impaired, and these effects can be thoroughly maintained.

DESCRIPTION OF EMBODIMENTS

Although the present invention is hereunder described in detail, but it should be construed that the following description is an example of the embodiments of the present invention, and the present invention is not limited to the following explained contents so far as it does not deviate the spirit thereof, and the present invention can be arbitrarily changed and carried out within a range where the spirit of the present invention is not deviated.

In this description, each expression including "to" interposed between numerical values or physical property values means that the range includes the values on both sides of the "to".

[Thermoplastic Elastomer for Carbon Fiber Reinforced Plastic Bonding Lamination]

The thermoplastic elastomer for carbon fiber reinforced plastic bonding lamination of the present invention (hereinafter referred to as "thermoplastic elastomer of the present invention") is a thermoplastic elastomer which is used as a thermoplastic elastomer of a laminated molded article of a carbon fiber reinforced plastic and the foregoing thermoplastic elastomer and is one containing a styrene-based thermoplastic elastomer and a polymer modified by an α,β-unsaturated carboxylic acid, wherein the styrene-based thermoplastic elastomer contains the following components (a) to (d), and a concentration of an α,β-unsaturated carboxylic acid derived from the polymer modified by the α,β-unsaturated carboxylic acid is 0.01 to 10% by mass.

Component (a): A hydrogenated block copolymer which is a hydrogenated product of an (A)-(B) block copolymer and/or an (A)-(B)-(A) block copolymer composed of a vinyl aromatic compound polymer block (A) and a conjugated diene polymer block (B) exclusive of isoprene alone, wherein at least 80% of double bonds of the conjugated diene moiety of the conjugated diene polymer block (B) is saturated through hydrogenation, and a weight average molecular weight thereof is 80,000 to 1,000,000;

Component (b): A softening agent for hydrocarbon-based rubber;

Component (c): A hydrogenated block copolymer composed of an (A)-(C)-(A) triblock copolymer which is composed of a vinyl aromatic compound polymer block (A) and a conjugated diene polymer block (C), wherein the conjugated diene polymer block (C) is constituted of isoprene, and a part or all of carbon-carbon double bonds based on isoprene are hydrogenated; and Component (d): An olefin-based crystalline resin.

<Component (a): Hydrogenated Block Copolymer>

The component (a) which is a constituent component of the styrene-based thermoplastic elastomer to be used in the present invention is a hydrogenated product of an (A)-(B) block copolymer and/or an (A)-(B)-(A) block copolymer composed of a vinyl aromatic compound polymer block (A) and a conjugated diene polymer block (B) exclusive of isoprene alone, wherein at least 80% of double bonds of the conjugated diene moiety of the conjugated diene polymer block (B) is saturated through hydrogenation, and a weight average molecular weight thereof is 80,000 to 1,000,000 (the foregoing hydrogenated block copolymer will be hereinafter occasionally referred to as "hydrogenated block copolymer (a)").

Examples of a vinyl aromatic compound constituting the vinyl aromatic compound polymer block (A) include one or more of styrene, t-butylstyrene, α-methylstyrene, o-, m-, or p-methylstyrene, 1,3-dimethylstyrene, vinylnaphthalene, and vinylanthracene, and styrene and α-methyl styrene are particularly preferred.

Examples of a conjugated diene monomer constituting the conjugated diene polymer block (B) include one or more of butadiene, 1,3-pentadiene, 2,3-dimethyl-1,3-butadiene, 2-methyl-1,3-pentadiene, 1,3-hexadiene, 4,5-diethyl-1,3-octadiene, and 3-butyl-1,3-octadiene, or a combination of isoprene and one or more of these conjugated diene monomers, and butadiene or a mixture of butadiene/isoprene in a mass ratio of 2/8 to 6/4 is especially preferred.

In the case where the conjugated diene monomer constituting the conjugated diene polymer block (B) is constituted of only butadiene, a block copolymer in which a 1,2-addition structure in a microstructure of the polybutadiene block is hydrogenated to an extent of 20 to 80% of the whole is preferred, and a block copolymer in which the 1,2-addition structure is hydrogenated to an extent of 30 to 60% of the whole is especially preferred.

The molecular structure of the aforementioned block copolymer of the component (a) may be any of straight-chained, branched, and radial structures, or a combination thereof.

The component (a) is a hydrogenated block copolymer obtained through hydrogenation of the aforementioned block copolymer, and its hydrogenation rate is a rate such that a hydrogenation rate of the double bond of the conjugated diene moiety of the conjugated diene polymer block (B) is 80% or more, and preferably 90 to 100%.

In the component (a), the aforementioned wordings "the hydrogenation rate is 80% or more" are synonymous with the aforementioned wordings "at least 80% of double bonds of the conjugated diene moiety of the conjugated diene polymer block (B) is saturated through hydrogenation".

The content of the vinyl aromatic compound polymer block (A) in the hydrogenated block copolymer (a) is preferably from 10 to 50% by mass, more preferably from 15 to 45% by mass, and still more preferably from 20 to 40% by mass. When the content of the vinyl aromatic compound polymer block (A) is less than 10% by mass, mechanical physical properties, such as tensile strength, and heat resistance tend to be deteriorated, whereas when it is more than 50% by mass, flexibility and rubber elasticity are inferior, and bleeding of the component (b) as mentioned later tends to be readily generated.

Although the weight average molecular weight of the hydrogenated block copolymer (a) is 80,000 to 1,000,000 in terms of a molecular weight as expressed in terms of polystyrene through measurement by gel permeation chromatography, it is preferably from 80,000 to 600,000, and more preferably from 80,000 to 400,000. When the weight average molecular weight is less than 80,000, rubber elasticity and mechanical strength are lowered, and bleeding of the component (b) as mentioned later is liable to be generated. On the other hand, in the case where the weight average molecular weight is more than 1,000,000, fluidity is inferior, and it becomes difficult to perform molding.

As for the production method of the hydrogenated block copolymer (a), any methods may be adopted so long as the aforementioned structure and physical properties are obtained. For example, a method described in JP 40-23798 A; and a method of performing block polymerization in an inert solvent in the presence of a lithium catalyst can be adopted. In addition, the hydrogenation treatment of such a block copolymer can be performed in an inert solvent in the presence of a hydrogenation catalyst by a method described in, for example, JP 42-8704 A, JP 43-6636 A, JP 59-133203 A, JP 60-79005 A, and so on.

The hydrogenated block copolymer (a) may be a block copolymer in which a polymer molecular chain is extended or branched via a coupling agent residue. Examples of the coupling agent which is used in this case include diethyl adipate, divinylbenzene, tetrachlorosilicon, butyltrichlorosilicon, tetrachlorotin, butyltrichlorotin, 1,2-dibromoethane, 1,4-chloromethylbenzene, bis(trichlorosilyl)ethane, epoxidized linseed oil, tolylene diisocyanate, and 1,2,4-benzene triisocyanate.

Examples of a commercially available product of the hydrogenated block copolymer (a) include products, such as "KRATON-G" (manufactured by Kraton Corporation), "SEPTON" (manufactured by Kuraray Co., Ltd.), and "TUFTEC" (manufactured by Asahi Kasei Chemicals Corporation).

The hydrogenated block copolymer (a) may be used alone or may be used in admixture of two or more thereof having a different block constitution or physical properties from each other.

<Component (b): Softening Agent for Hydrocarbon-Based Rubber>

The component (b) which is a constituent component of the styrene-based thermoplastic elastomer to be used in the present invention is a softening agent for hydrocarbon-based rubber (hereinafter occasionally referred to as "softening agent (b) for hydrocarbon-based rubber").

As the softening agent (b) for hydrocarbon-based rubber, a hydrocarbon having a weight average molecular weight of typically from 300 to 2,000, and preferably from 500 to 1,500 is used, and a mineral oil-based hydrocarbon or a synthetic resin-based hydrocarbon is suitable. Here, the weight average molecular weight is a molecular weight as expressed in terms of polystyrene through measurement by gel permeation chromatography.

In general, the softening agent for mineral oil-based rubber is a mixture of an aromatic hydrocarbon, a naphthene-based hydrocarbon, and a paraffin-based hydrocarbon. One in which the proportion of carbon of the aromatic hydrocarbon is 35% by mass or more relative to the total carbon amount is called as an aromatic oil; one in which the proportion of carbon of the naphthene-based hydrocarbon is 30 to 45% by mass is called as a naphthene-based oil; and one in which the proportion of carbon of the paraffin-based hydrocarbon is 50% by mass or more is called as a paraffin-based oil. In the present invention, a paraffin-based oil is suitably used.

The softening agent (b) for hydrocarbon-based rubber may be used alone or may be used in admixture of two or more thereof.

<Component (c): Hydrogenated Block Copolymer>

The component (c) which is a constituent component of the styrene-based thermoplastic elastomer to be used in the present invention is composed of an (A)-(C)-(A) triblock copolymer which is composed of a vinyl aromatic compound polymer block (A) and a conjugated diene polymer block (C), wherein the conjugated diene polymer block (C) is constituted of isoprene, and a part or all of carbon-carbon double bonds based on isoprene are hydrogenated (the foregoing hydrogenated block copolymer will be hereinafter occasionally referred to as "hydrogenated block copolymer (c)").

Similar to the vinyl aromatic compound polymer block (A) in the component (a), examples of a vinyl aromatic compound in the vinyl aromatic compound polymer block (A) include styrene, t-butyl styrene, α-methyl styrene, o-, m-, or p-methyl styrene, 1,3-dimethylstyrene, vinylnaphthalene, and vinylanthracene, and styrene and α-methylstyrene are particularly preferred.

The monomer constituting the conjugated diene polymer block (C) is isoprene.

The molecular structure of the aforementioned block copolymer of the component (c) may be any of straight-chained, branched, and radial structures, or a combination thereof.

The component (c) is a hydrogenated block copolymer obtained through hydrogenation of the aforementioned block copolymer, and its hydrogenation rate is a rate such that a hydrogenation rate of the double bond of the isoprene moiety of the conjugated diene polymer block (C) is preferably 50% or more, and more preferably from 70 to 100%.

In the component (c), the aforementioned wordings "the hydrogenation rate is 50% or more" are synonymous with the aforementioned wordings "at least 50% of double bonds of the isoprene moiety is saturated through hydrogenation".

The content of the vinyl aromatic compound polymer block (A) in the hydrogenated block copolymer (c) is preferably from 10 to 50% by mass, more preferably from 15 to 40% by mass, and still more preferably from 15 to 35% by mass. When the content of the vinyl aromatic compound polymer block (A) is less than 10% by mass, mechanical physical properties, such as tensile strength, and heat resistance tend to be deteriorated, whereas when it is more than 50% by mass, flexibility and rubber elasticity are inferior, and bleeding of the aforementioned component (b) tends to be easily generated.

The weight average molecular weight of the hydrogenated block copolymer (c) is preferably from 30,000 to 300,000, and more preferably from 50,000 to 250,000 in terms of a molecular weight as expressed in terms of polystyrene through measurement by gel permeation chromatography. When the weight average molecular weight is less than 30,000, rubber elasticity and mechanical strength are lowered, and bleeding of the aforementioned component (b) is liable to be generated. On the other hand, in the case where the weight average molecular weight is more than 300,000, fluidity is inferior, and it becomes difficult to perform molding.

The hydrogenated block copolymer (c) can be produced in the same method as in the aforementioned component (a).

Examples of a commercially available product of the hydrogenated block copolymer (c) include products, such as "HYBRAR" (manufactured by Kuraray Co., Ltd.).

The hydrogenated block copolymer (c) may be used alone or may be used in admixture of two or more thereof having a different block constitution or physical properties from each other.

<Component (d): Olefin-Based Crystalline Resin>

When the styrene-based thermoplastic elastomer which is used in the present invention contains an olefin-based crystalline resin as the component (d) to an extent of not affecting the adhesiveness, the heat resistance can be enhanced.

Examples of the olefin-based crystalline resin of the component (d) (hereinafter occasionally referred to as "olefin-based crystalline resin (d)") include an ethylene homopolymer, a copolymer of ethylene and an α-olefin or a vinyl monomer, such as vinyl acetate and ethylene acrylate, a propylene homopolymer, a block copolymer of propylene and an α-olefin, a random copolymer of propylene and an α-olefin, a 1-butene homopolymer, a random copolymer of 1-butene and an α-olefin, a 4-methyl-1-pentene homopolymer, and a random copolymer of 4-methyl-1-pentene and an α-olefin. Examples of other α-olefin as a comonomer include ethylene, 1-butene, 4-methyl-1-pentene, 1-hexene, and 1-octene, and one or more of these can be selected and used.

Among these olefin-based crystalline resins (d), from the viewpoint of heat resistance and compatibility, a crystalline polypropylene resin is preferred, and a polypropylene-based resin, such as homopolypropylene, block polypropylene, and random polypropylene, is more preferred.

As for the olefin-based crystalline resin (d), its melt flow rate (MFR) measured under a condition at 230° C. and a load of 21.2 N in conformity with a method described in JIS K7210 is preferably from 0.01 to 100 g/10 min, and more preferably from 0.1 to 70 g/min. In the case of using one, the MFR of which is less than the aforementioned lower limit, the fluidity is inferior, so that there is a tendency that it becomes difficult to perform molding, whereas in the case of using one, the MFR of which is more than the aforementioned upper limit, the melt viscosity decreases, and there is a tendency that it becomes difficult to perform sheet molding.

The olefin-based crystalline resin (d) may be used alone or may be used in admixture of two or more thereof having a different monomer composition or physical properties from each other.

<Content Ratio of Components (a) to (d)>

It is preferred that the styrene-based thermoplastic elastomer which is used in the present invention contains the aforementioned components (a) to (d), and based on 100 parts by mass of the sum total of the component (a) and the component (b), a content of the component (c) is 20 to 300 parts by mass, and a content of the component (d) is 10 to 100 parts by mass.

When the content of the component (c) is more than the aforementioned upper limit, bleeding of the oil is generated, stickiness increases, and workability is worsened, whereas when it is less than the aforementioned lower limit, bondability to the carbon fiber reinforced plastic is worsened. The content of the component (c) is more preferably from 40 to 200 parts by mass based on 100 parts by mass of the sum total of the component (a) and the component (b).

As mentioned above, when the component (d) is contained, heat resistance can be enhanced. When the content of the component (d) is the aforementioned lower limit or more, this effect can be satisfactorily obtained, whereas when it is more than the aforementioned upper limit, adhesiveness is inferior, and flexibility is worsened. The content of the component (d) is more preferably from 10 to 80 parts by mass based on 100 parts by mass of the sum total of the component (a) and the component (b).

As for a constitution ratio of the component (a) and the component (b), based on 100% by mass of the sum total of these components, it is preferred that the content of the component (a) is 20 to 80% by mass, and the content of the component (b) is 80 to 20% by mass, and it is more preferred that the content of the component (a) is 25 to 75% by mass, and the content of the component (b) is 75 to 25% by mass. When the content of the component (a) is smaller, and the content of the component (b) is larger than the foregoing range, heat resistance of the obtained thermoplastic elastomer is possibly inferior, or bleeding is possibly generated. On the other hand, when the content of the component (a) is larger, and the content of the component (b) is smaller than the foregoing range, flexibility and molding processability are worsened.

<Polymer Modified by α,β-Unsaturated Carboxylic Acid>

Examples of an α,β-unsaturated carboxylic acid as a modifier of the polymer modified by the α,β-unsaturated carboxylic acid, which is contained in the thermoplastic elastomer of the present invention, include acrylic acid, methacrylic acid, ethacrylic acid, maleic acid, fumaric acid, tetrahydrophthalic acid, itaconic acid, citraconic acid, crotonic acid, and isocrotonic acid. As the modifier, a derivative of such as α,β-unsaturated carboxylic acid may be used, and examples of the derivative include an acid anhydride or an ester of such an α,β-unsaturated carboxylic acid. Furthermore, the derivative may be a derivative, such as an acid halide, an amide, and an imide. Among these, maleic acid or an anhydride thereof is especially suitable.

As a polymer of a base material for modification of the polymer modified by the α,β-unsaturated carboxylic acid, a polyolefin is desired. Examples thereof include homopolymers of an α-olefin having 2 or more carbon atoms, such as ethylene, propylene, butene-1, hexene-1, 3-methylbutene-1, 4-methylpentene-1, heptene-1, octene-1, and decene-1; random or block copolymers of two or more of these monomers; random, block, or graft copolymers of, as a main component, an α-olefin having 2 or more carbon atoms and other monomer; and mixtures thereof. The polyolefin is especially preferably an ethylene-based resin or a propylene-based resin having a melt flow rate in conformity with JIS K7210 (MFR: In a case of a resin containing ethylene as a main component, measured under a condition at 190° C. and a load of 21.2 N, and in a case of a resin containing propylene as a main component, measured under a condition at 230° C. and a load of 21.2 N) of from 0.01 to 200 g/10 min, and preferably from 0.1 to 100 g/10 min. The polymer modified by the α,β-unsaturated carboxylic acid is most preferably polypropylene modified by maleic anhydride.

It is preferable that the polymer modified by the α,β-unsaturated carboxylic acid which is used in the present invention is a polymer in which the α,β-unsaturated carboxylic acid is grafted in a ratio ranging from 0.1 to 20 parts by mass, especially from 0.2 to 10 parts by mass, based on the 100 parts by mass of the polymer, namely a polymer modified by an α,β-unsaturated carboxylic acid in which a modification rate by the α,β-unsaturated carboxylic acid is 0.1 to 20% by mass, especially 0.2 to 10% by mass, based on 100% by mass of the polymer. When this modification rate is less than 0.1% by mass, a thermoplastic elastomer having satisfactory bondability cannot be produced, whereas when it is more than 20% by mass, incorporation of an unreacted material or a by-product increases, and bondability is lowered.

The modification rate by the α,β-unsaturated carboxylic acid of the polymer modified by the α,β-unsaturated carboxylic acid can be confirmed by, for example, 1H-NMR, IR absorption spectroscopy, ICP atomic emission spectroscopy with a high-frequency plasma emission analyzer, or the like. Namely, for example, in the case where the α,β-unsaturated carboxylic acid is maleic acid, the modification rate can be determined by measuring absorption inherent to maleic acid in a sample prepared by press molding in a sheet form having a thickness of about 100 specifically carbonyl characteristic absorption at 1,900 to 1,600 cm$^{-1}$ (C=O stretching vibration band).

The amount of the α,β-unsaturated carboxylic acid in the polymer modified by the α,β-unsaturated carboxylic acid as measured in this way is a sum total of the amount of the α,β-unsaturated carboxylic acid grafted in the polymer of the base material for modification of the polymer modified by the α,β-unsaturated carboxylic acid and the α,β-unsaturated carboxylic acid component which is not grafted in this polymer. In the present invention, the sum total of the α,β-unsaturated carboxylic acid grafted in the polymer of the base material for modification as measured by the aforementioned measurement method and the non-grafted α,β-unsaturated carboxylic acid component is defined as the amount or modification rate of the α,β-unsaturated carboxylic acid.

The production method of the polymer modified by the α,β-unsaturated carboxylic acid is not particularly limited; and the modification method is not particularly limited, and a solution modification method of undergoing the reaction in an organic solvent, or a melt modification method of undergoing modification can be used.

Such a polymer modified by the α,β-unsaturated carboxylic acid may be used alone, or may be used by mixing with an α,β-unsaturated carboxylic acid as a modifier or a base material polymer for modification, or in admixture of two or more thereof having a different modification rate from each other.

The thermoplastic elastomer of the present invention is one prepared by blending the aforementioned styrene-based thermoplastic elastomer with the polymer modified by the α,β-unsaturated carboxylic acid such that the concentration of the α,β-unsaturated carboxylic acid (content of the α,β-unsaturated carboxylic acid) derived from the polymer modified by the α,β-unsaturated carboxylic acid in the thermoplastic elastomer is 0.01 to 10% by mass.

When the concentration of the α,β-unsaturated carboxylic acid is less than 0.01% by mass, adhesiveness to the carbon fiber reinforced plastic is inferior, and satisfactory bondability cannot be obtained, whereas when it is more than 10% by mass, bondability is lowered. The concentration of the α,β-unsaturated carboxylic acid of the thermoplastic elastomer of the present invention is preferably from 0.01 to 8% by mass, and more preferably from 0.01 to 6% by mass.

<Organic Peroxide>

The thermoplastic elastomer of the present invention can be produced by heat mixing the aforementioned components (a) to (d) and the polymer modified by the α,β-unsaturated carboxylic acid by using a mixing machine, such as an extruder, and on that occasion, a crosslinking treatment may be performed by mixing an organic peroxide or a crosslinking assistant.

Specifically, examples of the organic peroxide include dimethyl peroxide, di-t-butyl peroxide, 2,5-dimethyl-2,5-di-(t-butylperoxy)hexane, 2,5-dimethyl-2,5-di-(t-butylperoxy)hexyne-3,1,3-bis(t-butylperoxyisopropyl)benzene, 1,1-bis(t-butylperoxy)-3,3,5-trimethylcyclohexane, n-butyl 4,4-bis(t-butylperoxy)valerate, benzoyl peroxide, p-chlorobenzoyl peroxide, 2,4-dichlorobenzoyl peroxide, t-butyl peroxybenzoate, t-butyl peroxyisopropyl carbonate, diacetyl peroxide, lauroyl peroxide, and t-butylcumyl peroxide, and 2,5-dimethyl-2,5-di-(t-butylperoxy)hexane, 2,5-dimethyl-2,5-di-(t-butylperoxy)hexyne-3, 1,3-bis(t-butylperoxyisopropyl)benzene, 1,1-bis(t-butylperoxy)-3,3,5-trimethylcyclohexane, and n-butyl 4,4-bis(t-butylperoxy)valerate are preferred. These organic peroxides can be used either alone or in admixture of two or more thereof.

The organic peroxide is used in an amount ranging typically from 0.05 to 3 parts by mass, and preferably from 0.1 to 2 parts by mass, based on 100 parts by mass of the sum total of the components (a) to (d).

On the occasion of the crosslinking treatment with such an organic peroxide, assistants for peroxy crosslinking, such as sulfur, p-quinone dioxime, p,p'-dibenzoyl quinone dioxime, N-methyl-N-4-dinitrosoaniline, nitrosobenzene, diphenylguanidine, and trimethylolpropane-N,N'-m-phenylenedimaleimide; polyfunctional methacrylate monomers, such as divinylbenzene, triallyl cyanurate, ethylene glycol dimethacrylate, diethylene glycol dimethacrylate, polyethylene glycol dimethacrylate, trimethylolpropane trimethacrylate, and ally methacrylate; and polyfunctional vinyl monomers, such as vinyl butyrate and vinyl stearate, can be blended.

The aforementioned crosslinking assistant, polyfunctional methacrylate, or polyfunctional polyvinyl polymer is used in an amount of typically from 0.1 to 5 parts by mass, and preferably from 0.2 to 4 parts by mass, based on 100 parts by mass of the sum total of the components (a) to (d).

<Other Components>

The thermoplastic elastomer of the present invention may be blended with various additives, such as a stabilizer, a lubricant, an antioxidant, a UV absorber, a foaming agent, a flame retardant, a colorant, and a filler, or other thermoplastic resin other than the essential components, or rubber, as the need arises.

Among these, in particular, it is preferred to add an antioxidant as the stabilizer. Examples of the antioxidant include monophenol-based, bisphenol-based, tri- or more polyphenol-based, thiobisphenol-based, naphthylamine-based, diphenylamine-based, and phenylenediamine-based antioxidants. Among these, monophenol-based, bisphenol-based, tri- or more polyphenol-based, and thiobisphenol-based antioxidants are preferred. In the case of blending the antioxidant, its addition amount is typically from 0.01 to 5 parts by mass, and preferably from 0.05 to 3 parts by mass, based on 100 parts by mass of the sum total of the components (a) to (d). When this addition amount is less than 0.01 parts by mass, the effect of the antioxidant is hardly obtained, and even when it is more than 5 parts by mass, an enhancement effect corresponding to the addition amount is not obtained, and such is not preferred from the standpoint of cost.

Examples of the thermoplastic resin other than the essential components include polyphenylene ether-based resins; polyamide-based resins, such as nylon 6 and nylon 66; polyester-based resins, such as polyethylene terephthalate and polybutylene terephthalate; polyoxymethylene-based resins, such as a polyoxymethylene homopolymer and a polyoxymethylene copolymer; polymethyl methacrylate-based resins; polystyrene-based resins; biodegradable resins; and vegetable-derived raw material resins.

Examples of the rubber include olefin-based rubbers, such as an ethylene/propylene copolymer rubber and an ethylene/propylene/non-conjugated diene copolymer rubber; polybutadiene rubbers; and styrene-based copolymer rubbers other than the essential components.

<Production Method of Thermoplastic Elastomer>

The thermoplastic elastomer of the present invention is produced through heat kneading of a blend of the thermoplastic elastomer containing the component (a): hydrogenated block copolymer, the component (b): softening agent for hydrocarbon-based rubber, the component (c): hydrogenated block copolymer, the component (d): olefin-based crystalline resin, the polymer modified by the α,β-unsaturated carboxylic acid, and further optionally, the organic peroxide, the crosslinking assistant, and the various additives.

In the production of the thermoplastic elastomer of the present invention, a Henschel mixer, a ribbon blender, a V-type blender, and the like are used as a mixing device; and a mixing roll, a kneader, a Banbury mixer, a Brabender Plastograph, a single screw extruder, a twin-screw extruder, and the like are used as a kneading device.

<Molding of Thermoplastic Elastomer>

The thermoplastic elastomer of the present invention can be molded by a molding machine, such as an injection molding machine, a single screw extrusion molding machine, a twin-screw extrusion molding machine, a compression molding machine, and a calendar processing machine, and by complexing a molded product thereof with a prepreg CFRP through lamination and integral molding, various structures can be obtained.

[Laminated Molded Article]

The laminated molded article of the present invention is one including a layer composed of a carbon fiber reinforced plastic; and a thermoplastic elastomer layer composed of a thermoplastic elastomer X laminated on the carbon fiber reinforced plastic.

The thermoplastic elastomer X contains a styrene-based thermoplastic elastomer and the aforementioned polymer modified by the α,β-unsaturated carboxylic acid, wherein the styrene-based thermoplastic elastomer contains at least the aforementioned compound (c), and the concentration of the α,β-unsaturated carboxylic acid derived from the polymer modified by the α,β-unsaturated carboxylic acid is 0.01 to 10% by mass.

It is preferable that the thermoplastic elastomer X is the aforementioned thermoplastic elastomer of the present invention.

The laminated molded article of the present invention may be one in which the thermoplastic elastomer layer is laminated as an intermediate layer between the carbon fiber reinforced plastic and the carbon fiber reinforced plastic, and may also be one in which the thermoplastic elastomer layer is laminated as a skin on the carbon fiber reinforced plastic.

The laminated molded article of the present invention may also be one in which a layer of a sliding material is further laminated on the aforementioned thermoplastic elastomer layer laminated on the carbon fiber reinforced plastic, namely one in which a sliding material layer is contained on the surface of the aforementioned thermoplastic elastomer layer on the opposite side to the aforementioned carbon fiber reinforced plastic.

As the carbon fiber reinforced plastic, although a carbon fiber reinforced epoxy resin is typically used, it should be construed that the resin species of the carbon fiber reinforced plastic is by no means limited to the epoxy resin. In addition, commercially available products can be used as the carbon fiber reinforced plastic, and the carbon fiber reinforced plastic may be either a single kind or a combination of two or more different kinds.

The layer composed of a carbon fiber reinforced plastic can be obtained by using the aforementioned carbon fiber reinforced plastic.

As the sliding material which is used for the surface layer, silane-crosslinked polyethylene and so on can be used.

In such a laminated molded article of the present invention, its impact resistance is significantly improved owing to the thermoplastic elastomer laminated on the carbon fiber reinforced plastic with good adhesiveness, and it is possible to apply the laminated molded article of the present invention in a wide range of fields inclusive of an automobile parts structure of every sort as well as a shipping parts structure, a power parts structure, a building parts structure, and so on. Above all, the laminated molded article of the present invention is suitably used for an automobile application which is eagerly desired to achieve lightweight, and in such an application, the effect for improving the impact resistance according to the present invention is thoroughly exhibited.

[Bonding Method of Carbon Fiber Reinforced Plastic]

The bonding method of the carbon fiber reinforced plastic of the present invention is a method of bonding the carbon fiber reinforced plastic by using the aforementioned thermoplastic elastomer X.

Specifically, the foregoing bonding method is a method in which by using the layer composed of the carbon fiber reinforced plastic and the thermoplastic elastomer layer composed of the aforementioned thermoplastic elastomer X, the thermoplastic elastomer layer composed of the thermoplastic elastomer X is laminated on the layer composed of the carbon fiber reinforced plastic through thermal press bonding or the like for 1 to 5 hours under a condition at 70 to 250° C. and a pressure of 0.1 to 1.0 MPa, by which the resulting layer works as an adhesive layer, and a separate layer composed of other base material (inclusive of the layer composed of the carbon fiber reinforced plastic) is further bonded thereon.

EXAMPLES

Although the present invention is hereunder described in more detail by reference to Examples, it should be construed that the present invention is not limited to the following Examples so long as it does not deviate the spirit thereof. The values of the various production conditions and evaluation results in the following Examples mean preferred values of the upper or lower limits in embodiments of the present invention, and a preferred range may be a range defined by the aforementioned upper limit or lower limit value and either the value in the Example or a combination of the values in the Examples.

[Raw Materials]

The following raw materials were used in the following several Examples.

<Component (a): Hydrogenated Block Copolymer>
SEBS-1: Hydrogenated product of copolymer of (styrene block)-(butadiene block)-(styrene block)
  Styrene content: 33% by mass
  Hydrogenation rate: 98% or more
  Weight average molecular weight: about 260,000
SEBS-2: Hydrogenated product of copolymer of (styrene block)-(butadiene block)-(styrene block)
  Styrene content: 29% by mass
  Hydrogenation rate: 98% or more
  Weight average molecular weight: about 90,000
<Component (b): Softening Agent for Hydrocarbon-Based Rubber>
OIL-1: Paraffin-based oil ("Diana Process Oil PW-90", manufactured by Idemitsu Kosan Co., Ltd.)
  Weight average molecular weight: 550
  Kinematic viscosity at 40° C.: 96 mm$^2$/sec
<Component (c): Hydrogenated Block Copolymer>
SEPS-1: Hydrogenated product of copolymer of (styrene block)-(isoprene block)-(styrene block)
  Styrene content: 20% by mass
  Hydrogenation rate: 98% or more
  Weight average molecular weight: about 100,000
<Component (d): Olefin-based Crystalline Resin>
PP-1: Propylene homopolymer (manufactured by Japan Polypropylene Corporation)
  Melt flow rate: 5 g/10 min (at 230° C. and a load of 21.2 N)
PP-2: Propylene/ethyl random copolymer (manufactured by Japan Polypropylene Corporation)
  Melt flow rate: 1 g/10 min (at 230° C. and a load of 21.2 N)

<Polymer Modified by α,β-Unsaturated Carboxylic Acid>
MAH-PP: Polypropylene modified by Maleic anhydride
  Maleic anhydride content (modification rate): 1.0% by mass <Evaluation Method of Thermoplastic Elastomer>

Various evaluation methods of the thermoplastic elastomers in the Examples and Comparative Examples are shown below.

In the measurement of the following (2), each of the thermoplastic elastomers was injection molded with an injection molding machine of an in-line screw type (a product No.: IS130, manufactured by Toshiba Machine Co., Ltd.) under a condition at an injection pressure of 50 MPa, a cylinder temperature of 220° C., and a die temperature of 40° C., thereby molding a sheet of 2 mm in thickness×120 mm in width×80 mm in length.

In the tensile test of the following (3), a dumbbell-shaped test piece was punched out from the obtained sheet (2 mm in thickness×120 mm in width×80 mm in length) by using a test piece punching blade (JIS No. 3, dumbbell-shaped) in conformity with JIS K6251, and the measurement was performed by using this test piece.

(1) Melt Flow Rate (MFR)

The measurement was performed at 230° C. and a load of 21.2 N in conformity with JIS K7210.

(2) Durometer Hardness A

The hardness (after 15 seconds) was measured in conformity with JIS K6253 (JIS-A).

(3) Tensile Strength at Break/Elongation at Break (Tensile Test)

The measurement was performed at a testing rate of 500 mm/min in conformity with JIS K6251

<Evaluation Method of Thermoplastic Elastomer Sheet>

(Maximum Peel Strength)

The thermoplastic elastomer sheet obtained in each Example was sandwiched between two sheets of prepregs of CFRP having an epoxy resin impregnated therein (20 cm in square and 0.35 mm in thickness), and the resultant was subjected to thermal press bonding in an autoclave at 130° C. and a pressure of 0.5 MPa for 4 hours, thereby obtaining a laminated molded article having the thermoplastic elastomer sheet laminated between the CFRP sheets.

One of the CFRP sheets and the thermoplastic elastomer sheet of the obtained laminated molded article were notched in a width of 25 mm by using a cutter; the other CFRP sheet was peeled off from the thermoplastic elastomer; an end of that CFRP sheet and an end of the laminate of the CFRP sheet and the thermoplastic elastomer sheet were each installed in a chuck of an autograph; and peeling was performed at 180°, thereby the maximum peel strength was measured.

(Maximum Peel Strength after Long-Term Storage>

After allowing the thermoplastic elastomer sheet obtained in each Example to stand at room temperature for 3 months, a laminated molded article was prepared in the same manner as in the laminated molded article in the aforementioned evaluation of maximum peel strength, and the obtained laminated molded article was measured for the maximum peel strength at 180° in the same manner as in the aforementioned evaluation of maximum peel strength.

(Impact Test)

On the sheet surface of a laminated molded article prepared in the same manner as in the laminated molded article in the aforementioned evaluation of maximum peeling strength, 1 kg of a weight was allowed to fall down on a ball of ϕ0.625 inch from a height of 30 cm at ordinary temperature by using a Du Pont impact tester, and a crack condition of the laminated molded article was evaluated according to the following criteria.

As Comparative Example 2, a laminated molded article was obtained in the same manner as in the aforementioned maximum peel strength, except that the thermoplastic elastomer sheet was not used, and only the prepreg of CFRP was used, and this laminated molded article made of only the CFRP was similarly subjected to the impact test and evaluated.

A: The CFRP sheet remained without being cracked.
B: The CFRP sheet was cracked.

(Overall Evaluation)

The overall evaluation was made on a basis of the aforementioned results according to the following criteria.

A: The maximum peel strength and the maximum peel strength after long-term storage were 10.0 N/cm or more, and the CFRP sheet remained without being cracked in the impact test.

B: The maximum peel strength and the maximum peel strength after long-term storage were 1.0 N/cm or more and less than 10.0 N/cm, and the CFRP sheet remained without being cracked in the impact test.

C: The maximum peel strength and the maximum peel strength after long-term storage were less than 1.0 N/cm, and the CFRP sheet remained without being cracked in the impact test.

D: The maximum peel strength and the maximum peel strength after long-term storage were less than 1.0 N/cm, and the CFRP sheet was cracked.

Examples 1 to 5 and Comparative Example 1

<Preparation of Thermoplastic Elastomer>

To a blend preparation shown in Table 1, 0.1 parts by mass of, as a stabilizer, tetrakis[methylene-3-(3',5'-di-t-butyl-4'-hydroxyphenyl)propionate]methane ("IRGANOX 1010", manufactured by Ciba Specialty Chemicals) was added, and the contents were mixed with a Henschel mixer, and the mixture was then extruded with a twin-screw extruder "TEX 30", manufactured by JSW at 210° C. and a screw of a rotation rate of 400 rpm by using a weight feeder, thereby obtaining each of thermoplastic elastomers.

<Preparation of Thermoplastic Elastomer Sheet>

Each of the obtained thermoplastic elastomers was press molded with a press under a condition at a temperature of 200° C., thereby preparing a thermoplastic elastomer sheet having a thickness of 1 mm.

Using each of the obtained thermoplastic elastomer sheets, the aforementioned evaluations were performed. The results are shown in Table 1.

[Table 1]

TABLE 1

| | | | Example | | | | | Comparative Example | |
|---|---|---|---|---|---|---|---|---|---|
| | | | 1 | 2 | 3 | 4 | 5 | 1 | 2 |
| Styrene-based thermoplastic elastomer | Component (a) | SEBS-1 (parts by mass) | — | — | — | 50 | 50 | — | — |
| | | SEBS-2 (parts by mass) | 40 | 40 | 40 | — | — | 40 | — |
| | Component (b) | OIL-1 (parts by mass) | 60 | 60 | 60 | 50 | 50 | 60 | — |
| | Component (c) | SEPS-1 (parts by mass) | 80 | 105 | 105 | 170 | 170 | — | — |
| | Component (d) | PP-1 (parts by mass) | 40 | 40 | 30 | — | — | 20 | — |
| | | PP-2 (parts by mass) | — | — | — | 60 | 55 | — | — |
| Polymer modified by α,β-unsaturated carboxylic acid | MAH-PP | Concentration of maleic anhydride in thermoplastic elastomer composition (% by mass) | 0.03 | 0.03 | 0.05 | 0.02 | 0.03 | 0.03 | — |
| MFR (at 230° C., load: 21.2N) | g/10 min | | 18.0 | 15.4 | 19.7 | 8.6 | 9.3 | 8.0 | — |
| Durometer hardness A (after 15 seconds) | — | | 68 | 65 | 62 | 68 | 68 | 72 | — |
| Tensile strength at break | MPa | | 7.2 | 10.6 | 9.9 | 13.3 | 12.9 | 11.8 | — |
| Elongation at break | % | | 780 | 865 | 940 | 800 | 800 | 960 | — |
| Evaluation results of thermoplastic elastomer sheet | Maximum peel strength | N/cm | 7.1 | 13.6 | 8.8 | 11.5 | 13.1 | 0.2 | — |
| | Maximum peel strength after long-term storage | N/cm | 7.2 | 14.6 | 8.7 | 11.8 | 13.5 | 0.2 | — |
| | Impact test | | A | A | A | A | A | A | B |
| | Overall judgement | | B | A | B | A | A | C | D |

From Table 1, it is noted that according to the thermoplastic elastomer of the present invention obtained in each of Examples 1 to 5; the bonding lamination with the carbon fiber reinforced plastic can be easily performed; the laminated molded article with high adhesiveness can be obtained; and the impact resistance of the carbon fiber reinforced plastic can be significantly improved. In addition, it is noted that according to the thermoplastic elastomer of the present invention obtained in each of Examples 1 to 5, the carbon fiber reinforced plastic laminated article which is able to secure the adhesiveness and has high adhesiveness, even in molding after long-term storage, and hence, is usable for an endurance application can be provided.

In contrast, the laminated molded article of Comparative Example 2 in which the thermoplastic elastomer of the present invention is not laminated is poor in the impact resistance. In Comparative Example 1 which does not contain the component (c) in the thermoplastic elastomer, the adhesiveness to CFRP is poor.

While the present invention has been described in detail and with reference to specific embodiments thereof, it will be apparent to one skilled in the art that various changes and modifications can be made therein without departing from the spirit and scope thereof. The present application is based on a Japanese patent application filed on Mar. 17, 2017 (Japanese Patent Application No. 2017-052359), the entireties of which are incorporated by reference.

The invention claimed is:

1. A thermoplastic elastomer composition, comprising:
polyolefin modified by an α,β-unsaturated carboxylic acid, wherein
a concentration of an α,β-unsaturated carboxylic acid derived from the polyolefin modified by the α,β-unsaturated carboxylic acid in the thermoplastic elastomer composition is from 0.01 to 10% by mass; and
a styrene based thermoplastic elastomer comprising:
component (a): a hydrogenated block copolymer which is a hydrogenated product of an (A)-(B) block copolymer and/or an (A)-(B)-(A) block copolymer composed of a vinyl aromatic compound polymer block (A) and a conjugated diene polymer block (B), wherein at least 80% of double bonds of the conjugated diene moiety of the conjugated diene polymer block (B) is saturated through hydrogenation, and a weight average molecular weight thereof is 80,000 to 1,000,000;
component (b): a softening agent selected from a mineral oil-based hydrocarbon having a weight average molecular weight of from 300 to 2,000, a synthetic resin-based hydrocarbon having a weight average molecular weight of from 300 to 2,000 or a mixture thereof;
component (c): a hydrogenated block copolymer composed of an (A)-(C)-(A) triblock copolymer which is composed of a vinyl aromatic compound polymer block (A) and a conjugated diene polymer block (C), wherein the conjugated diene polymer block (C) is constituted of isoprene; and a part or all of carbon-carbon double bonds based on isoprene are hydrogenated; and
component (d): an olefin-based crystalline resin;
wherein based on 100 parts by mass of the sum total of the component (a) and the component (b), a content of the component (c) is 20 to 300 parts by mass.

2. The thermoplastic elastomer for carbon fiber reinforced plastic bonding lamination according to claim 1,
wherein based on 100 parts by mass of the sum total of the component (a) and the component (b), a content of the component (d) is 10 to 100 parts by mass; and
based on 100% by mass of the sum total of the component (a) and the component (b), an occupying proportion of the component (a) is 20 to 80% by mass and an occupying proportion of the component (b) is 80 to 20% by mass.

3. The thermoplastic elastomer for carbon fiber reinforced plastic bonding lamination according to claim 1, wherein the polyolefin modified by the α,β-unsaturated carboxylic acid is a polypropylene modified by a maleic anhydride.

4. The thermoplastic elastomer for carbon fiber reinforced plastic bonding lamination according to claim 1, wherein the component (a) is a hydrogenated block copolymer having a content of the vinyl aromatic compound polymer block (A) of 10 to 50% by mass.

5. The thermoplastic elastomer for carbon fiber reinforced plastic bonding lamination according to claim 1, wherein the component (c) is a hydrogenated block copolymer in which the content of the vinyl aromatic compound polymer block (A) is 10 to 50% by mass, a weight average molecular weight is 30,000 to 300,000, and at least 50% of double bonds of the isoprene moiety is saturated through hydrogenation.

6. The thermoplastic elastomer for carbon fiber reinforced plastic bonding lamination according to claim 1, wherein the component (b) is a mineral oil-based hydrocarbon having a weight average molecular weight of from 300 to 2,000 which is a paraffin-based oil.

7. The thermoplastic elastomer for carbon fiber reinforced plastic bonding lamination according to claim 1, wherein the component (d) is at least one olefin-based crystalline resin selected from the group consisting of a homopolypropylene, a block polypropylene, and a random polypropylene, each having a melt flow rate of 0.01 to 100 g/10 min at 230° C. and a load of 21.2 N.

8. A laminated molded article comprising a layer composed of a carbon fiber reinforced plastic and a thermoplastic elastomer layer composed of a thermoplastic elastomer laminated on the carbon fiber reinforced plastic,
wherein the thermoplastic elastomer contains a styrene-based thermoplastic elastomer and a polyolefin modified by an α,β-unsaturated carboxylic acid,
the styrene-based thermoplastic elastomer contains the following components (a) to (d), and
a concentration of an α,β-unsaturated carboxylic acid derived from the polyolefin modified by the α,β-unsaturated carboxylic acid is 0.01 to 10% by mass:
component (a): a hydrogenated block copolymer which is a hydrogenated product of an (A)-(B) block copolymer and/or an (A)-(B)-(A) block copolymer composed of a vinyl aromatic compound polymer block (A) and a conjugated diene polymer block (B), wherein at least 80% of double bonds of the conjugated diene moiety of the conjugated diene polymer block (B) is saturated through hydrogenation, and a weight average molecular weight thereof is 80,000 to 1,000,000;
component (b): a softening agent selected from a mineral oil-based hydrocarbon having a weight average molecular weight of from 300 to 2,000, a synthetic resin-based hydrocarbon having a weight average molecular weight of from 300 to 2,000 or a mixture thereof;

component (c): a hydrogenated block copolymer composed of an (A)-(C)-(A) triblock copolymer which is composed of a vinyl aromatic compound polymer block (A) and a conjugated diene polymer block (C), wherein the conjugated diene polymer block (C) is constituted of isoprene, and a part or all of carbon-carbon double bonds based on isoprene are hydrogenated; and component (d): an olefin-based crystalline resin;

wherein based on 100 parts by mass of the sum total of the component (a) and the component (b), a content of the component (c) is 20 to 300 parts by mass.

9. The laminated molded article according to claim 8, wherein based on 100 parts by mass of the sum total of the component (a) and the component (b), a content of the component (c) is 20 to 300 parts by mass and a content of the component (d) is 10 to 100 parts by mass, and based on 100% by mass of the sum total of the component (a) and the component (b), an occupying proportion of the component (a) is 20 to 80/6 by mass and an occupying proportion of the component (b) is 80 to 20% by mass.

10. The laminated molded article according to claim 8, wherein the polyolefin modified by the α,β-unsaturated carboxylic acid is a polypropylene modified by maleic anhydride.

11. The laminated molded article according to claim 9, wherein the component (a) is a hydrogenated block copolymer having a content of the vinyl aromatic compound polymer block (A) of 10 to 50% by mass.

12. The laminated molded article according to claim 8, wherein the component (c) is a hydrogenated block copolymer in which a content of the vinyl aromatic compound polymer block (A) is 10 to 50% by mass, a weight average molecular weight is 30,000 to 300,000, and at least 50% of double bonds of the isoprene moiety is saturated through hydrogenation.

13. The laminated molded article according to claim 9, wherein the component (b) is a mineral oil-based hydrocarbon having a weight average molecular weight of from 300 to 2,000 which is a paraffin-based oil.

14. The laminated molded article according to claim 9, wherein the component (d) is at least one olefin-based crystalline resin selected from the group consisting of a homopolypropylene, a block polypropylene, and a random polypropylene, each having a melt flow rate of 0.01 to 100 g/10 min at 230° C. and a load of 21.2 N.

15. The laminated molded article according to claim 8, wherein a sliding material layer is contained on the surface of the thermoplastic elastomer layer on the opposite side to the carbon fiber reinforced plastic.

16. An automobile parts structure comprising the laminated molded article according to claim 8.

17. A shipping parts structure comprising the laminated molded article according to claim 8.

18. A power parts structure comprising the laminated molded article according to claim 8.

19. A method of bonding a carbon fiber reinforced plastic comprising bonding the carbon fiber reinforced plastic with the thermoplastic elastomer composition of claim 1.

20. The thermoplastic elastomer for carbon fiber reinforced plastic bonding lamination according to claim 1, wherein a weight average molecular weight of the component (c) is from 30,000 to 300,000.

21. The laminated molded article according to claim 8, wherein a weight average molecular weight of the component (c) is from 30,000 to 300,000.

* * * * *